(12) United States Patent
Hammond

(10) Patent No.: US 6,746,612 B2
(45) Date of Patent: Jun. 8, 2004

(54) WATER RECYCLING SYSTEM AND METHOD

(75) Inventor: Scot M. Hammond, Lake Worth, FL (US)

(73) Assignee: University of Florida, Gainesville, FL (US)

( * ) Notice: Subject to any disclaimer, the term of this patent is extended or adjusted under 35 U.S.C. 154(b) by 270 days.

(21) Appl. No.: 09/952,911

(22) Filed: Sep. 14, 2001

(65) Prior Publication Data

US 2003/0141257 A1 Jul. 31, 2003

(51) Int. Cl.[7] .................................................. C02F 1/00
(52) U.S. Cl. ...................... 210/744; 210/747; 210/764; 210/121; 210/170; 210/205; 210/209
(58) Field of Search ............................... 210/744, 747, 210/764, 121, 170, 205, 209

(56) References Cited

U.S. PATENT DOCUMENTS

| | | |
|---|---|---|
| 4,145,279 A | 3/1979 | Selby, III |
| 4,162,218 A | 7/1979 | McCormick |
| 4,317,732 A | 3/1982 | Shoquist |
| 5,039,407 A | 8/1991 | Mohrman |
| 5,084,920 A | 2/1992 | Kimball |
| 5,099,874 A | 3/1992 | Della Cave |
| 5,100,540 A | 3/1992 | Ramirez et al. |
| 5,106,493 A | 4/1992 | McIntosh |
| 5,210,886 A | 5/1993 | Coe, III |
| 5,251,346 A | 10/1993 | Donati |
| 5,274,861 A | 1/1994 | Ford |
| 5,317,766 A | 6/1994 | McDonald et al. |
| 5,345,625 A | 9/1994 | Diemand |
| 5,452,956 A | 9/1995 | Gilliam |
| 5,465,434 A | 11/1995 | Coe |
| 5,498,330 A | 3/1996 | Delle Cave |
| 5,573,677 A | 11/1996 | Dembrosky |
| 5,759,387 A | 6/1998 | Wilkes |
| 5,845,346 A | 12/1998 | Johnson, Jr. |
| 5,868,937 A | 2/1999 | Back et al. |
| 6,015,488 A | 1/2000 | Gavin |
| 6,132,138 A | 10/2000 | Haese |
| 6,139,729 A | 10/2000 | Gonzalez, Jr. |

Primary Examiner—Betsey Morrison Hoey
(74) Attorney, Agent, or Firm—Akerman Senterfitt

(57) ABSTRACT

The invention relates to a method and system of water recycling in residential households. A water recycling method includes the steps of collecting water from at least one residential water source and channeling water from at least one residential water source through pipes via gravity to a storage tank. The method includes the steps of filtering and treating the water with a sanitizing agent to remove impurities. The method includes the step of delivering water to the soil and subsoil of the landscape. A water recycling system includes at least one residential water source and a storage tank to collect recycled water from at least one household water source. The pipes are adapted to channel water from at least one residential water source via gravity. A filter and a sanitizing agent can be included to remove impurities. A water delivery device is included to deliver water to the aquifer, soil and subsoil of the landscape.

32 Claims, 2 Drawing Sheets

WATER RECYCLING SYSTEM AND METHOD

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF INVENTION

1. Technical Field

The present invention relates generally to water recycling. More particularly, the invention relates to water recycling in residential areas.

2. Description of the Related Art

Several attempts have been made to develop a residential water recycling system that recycles water consumed during household activities and utilizes the recycled water for other purposes. For instance, a number of inventions in the prior art have incorporated water recycling systems for use in recycling water from residential appliances. Specifically, in U.S. Pat. No. 5,100,540 to Ramirez et al an apparatus is disclosed for collecting and reusing substantially all of the gray water from a source such as a household washing machine. Moreover, the water recycling system includes a tank for receiving water; a pump for pumping the water out of the tank; an activator for activating the pump when the water reaches a predetermined first level in the tank; a deactivator for deactivating the pump when the water reaches a predetermined second level in the tank; and a filter formed from stretch pantyhose for filtering lint from the water. While the water recycling system disclosed in Ramirez can be an adequate solution for the basic purpose and function for which it had been specifically designed, the Ramirez system is deficient with respect to its failure to provide the most efficient and convenient structure for the recycling of water from residential environments. The system disclosed in Ramirez is complex and expensive to install with an existing residential plumbing system.

The need for water recycling systems has increased over the years amid concerns of water shortages. Many areas of the country have implemented water restrictions in order to assist in circumventing the wasteful use of available water supplies. For example, in Florida during particular months of the year water use can be restricted to certain hours of the day for specified purposes only. Water restrictions and other related water regulations create a need for a water recycling system that is both efficient and convenient. Efforts which have been made to provide limited resolution to the problems related to water recycling systems. For example, varying types of water recycling systems are described in U.S. Pat. No. 4,162,218 to McCormick, U.S. Pat. No. 5,85,346 to Johnson. However, these systems and other systems disclosed in the prior art are deficient in consequence of malfunction problems occurring during operation of the water recycling system. Additionally, water recycling systems in the prior art, such as the McCormick system, are complex, expensive and susceptible to failure. The system disclose in Johnson is specifically adapted for use in conjunction with toilets and further incorporates the use of a municipal water supply. Systems utilizing municipal water supplies are problematic due to the high likelihood of contamination resulting from any contamination associated with the municipal water supply.

Oftentimes water recycling systems can be extremely expensive to modify and can even be more expensive to newly install. Several systems include extensive pipes and valves to enable the system. Water recycling systems that include such complex designs usually require constant maintenance and attention to provide continuous operation without any problems. As a result, many users spend inordinate amounts of time operating systems in the prior art that should be very simple to use. Many individuals find the available water recycling systems tedious to use and consequently abandon use of such burdensome and problematic water recycling systems.

Using a defective water recycling system that experiences problems, such as flooding or contamination, can sometimes result in misusing and wasting more water than a residence without a water recycling system. Consequently, burdensome water recycling systems can cause one to totally abandon water recycling.

Water recycling systems should be unproblematic and simple to use. However, this is not the case for many water recycling systems in the prior art which require constant maintenance. Recycling water is a highly regarded environmental and social concern that society should promote to ensure that the quality and supply of water continues for the present and immediate future. In order to promote and improve present water recycling efforts, the process of water recycling should be made simple and easy. Accordingly, there exists a need for a water recycling system that provides effective and efficient water recycling, requiring minimal effort on behalf of the user.

SUMMARY OF INVENTION

The present invention relates to a method and system of water recycling for residential households. The present invention provides an efficient and convenient method and system of water recycling and provides recycled water that is free of contaminants and pollutants.

A water recycling method, according to the invention comprises the steps of collecting water from at least one residential water source and channeling water from at least one residential water source through pipes via gravity to a storage tank. The method also comprises the steps of filtering water received in the storage tank to remove impurities and treating the water received in the storage tank with a sanitizing agent. Additionally, the method includes the step of delivering water from the storage tank to the soil and subsoil of the surrounding landscape to maintain the moisture content of the landscape.

A water recycling system which has been configured in accordance with the inventive arrangements can comprise at least one residential water source and a storage tank to collect recycled water from at least one residential water source. The water recycling system can include a plurality of pipes. The pipes can be adapted to channel water from at least one residential water source via gravity. A filter can be affixed to the storage tank to remove any impurities from the recycled water. A sanitizing agent can be included in the water received in the storage tank. Additionally, the water recycling system can include a water delivery device to deliver water received in the storage tank to the soil and subsoil of the surrounding landscape to maintain moisture content of landscape.

The present invention permits water to be recycled from a shower, bathroom tub, bathroom sink and washing machine. Additionally, the system can be adapted to other water sources such as lakes and canals. A plurality of storage tanks can be included in the water recycling system. The storage tanks can include an opening providing access to the storage tank for maintaining and cleaning of the storage tank. The storage tanks can be individually accessible. Water can be filtered as the water enters and exits the storage tanks. The storage tanks can be positioned at a lower height relative to the pipes extending toward the storage tank. For instance, the storage tank can be positioned underground, while the connecting pipes are at a higher level.

A back flow structure can be adapted to the pipes exiting the storage tank to maintain priming of the attached pump. A float switch device also can be adapted to the storage tank and pipes to prevent water overflow. The water delivery system can include a water delivery device such as a sprinkler. The sprinkler can be integrated to the storage tank to dispense water from the storage tank to the surrounding soil and subsoil of the landscape and aquifer. A pump and time clock also can be connected to the sprinkler device to further assist in the delivery of water to the surrounding soil and subsoil of the landscape.

The method and system of water recycling for residential households provides the ability to circumvent the needless consumption of one's water supply. Further, the present invention provides a convenient way of saving money along with preserving limited water resources.

BRIEF DESCRIPTION OF THE DRAWINGS

The invention is pointed out with particularity in the appended claims. The above and further advantages of this invention may be better understood by referring to the following description taken in conjunction with the accompanying drawings, it being understood, however, that the invention is not limited to the precise arrangements and instrumentalities shown.

DETAILED DESCRIPTION

The present invention relates to a method and system of water recycling for residential households. More particularly, the present invention provides an efficient and convenient water recycling method and system for residential homes allowing water used for ordinary residential activities to be used for other suitable purposes. Additionally, the invention provides a method and system of water recycling that is free of contaminates and pollutants. Although the illustrations provided herewith depict the present invention in specific embodiments, it is understood that the illustrations are intended to be for illustrative purposes only. Accordingly, it is understood that the invention can exist in several embodiments.

A water recycling method, according to the invention comprises the steps of collecting water from at least one residential water source 12 and channeling water from at least one residential water source 12 through pipes 18 via gravity to a storage tank 14. The method also comprises the steps of filtering water received in the storage tank 14 to remove impurities and treating water received in the storage tank 14 with a sanitizing agent. Additionally, the method includes the step of delivering water from the storage tank 14 to soil and subsoil of surrounding landscape to maintain moisture content of the landscape.

Figure 1:
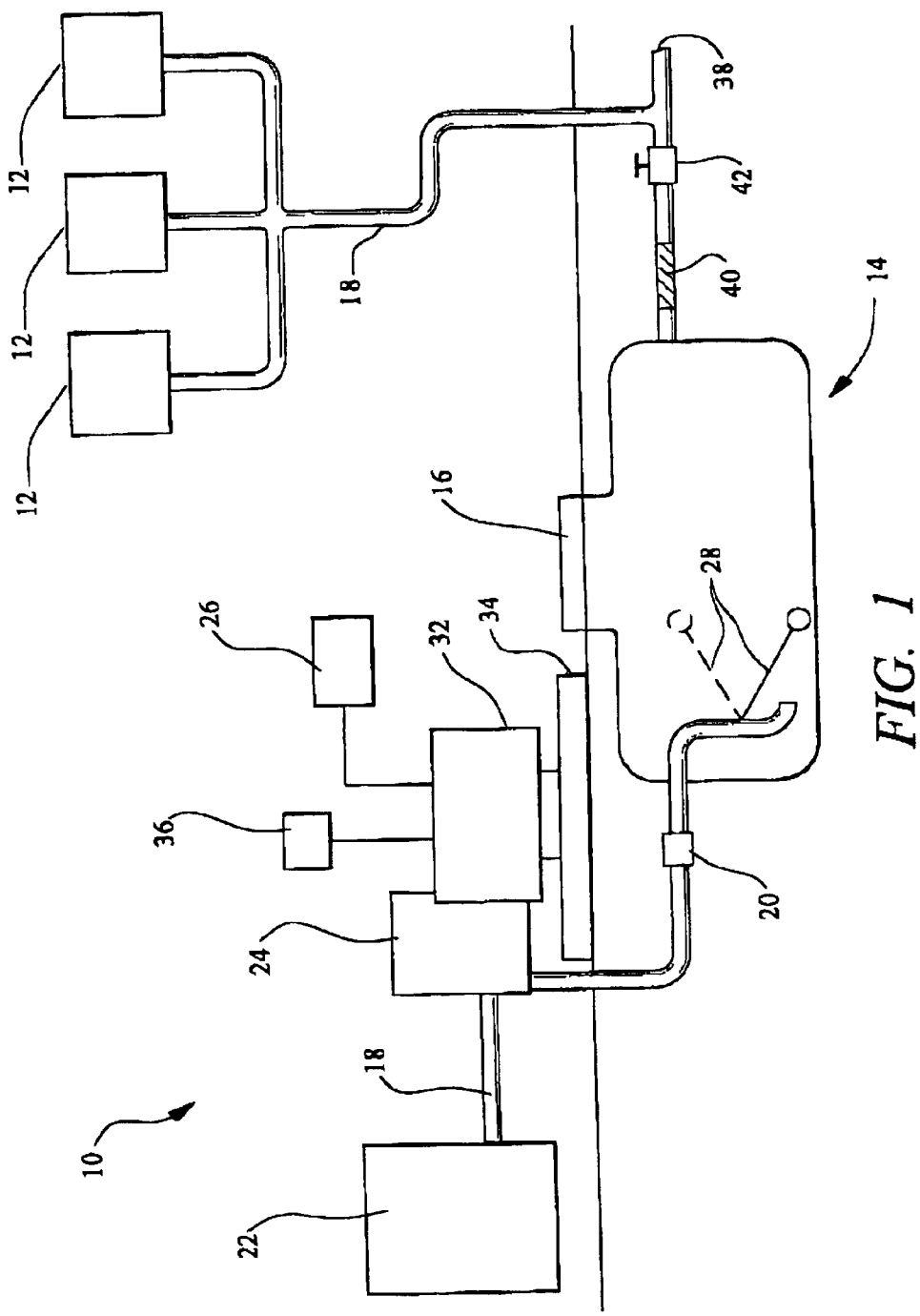
FIG. 1 Shows a perspective view of a water recycling system.
Figure 2:
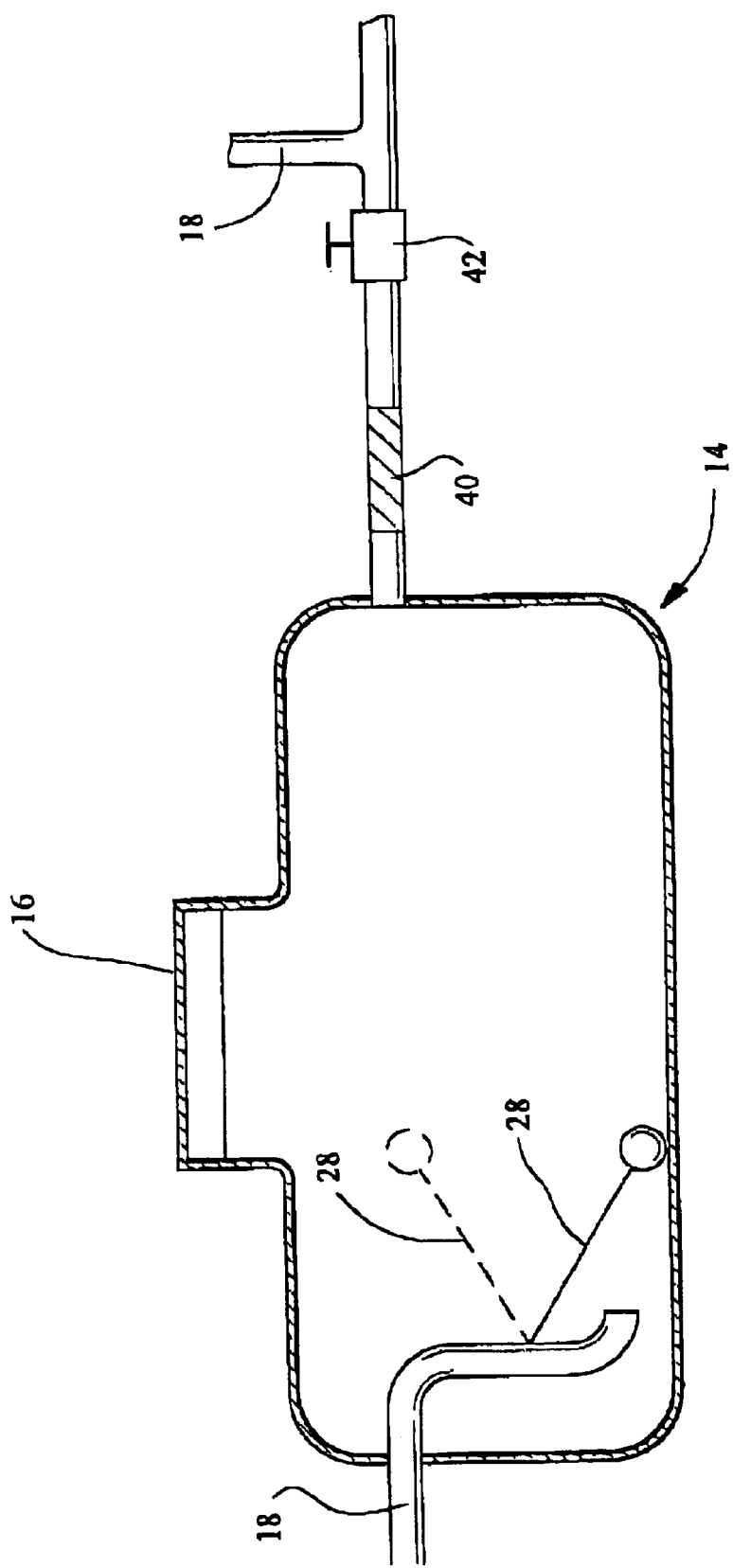
FIG. 2 Shows a perspective view of a storage tank having accessible opening.

FIGS. 1–2 taken together illustrate a water recycling system 10 configured in accordance with the invention arrangements. A water recycling system 10 which has been configured in accordance with the inventive arrangements comprises at least one residential water source 12 and a storage tank 14 to collect recycled water from at least one residential water source 12. The water recycling system 10 can include a plurality of pipes 18. The pipes 18 can be adapted to channel water from at least one residential water source 12 via gravity. A filter 40 can be affixed to the storage tank 14 to remove impurities from the recycled water. A sanitizing agent can be included in the water received in the storage tank 14. Additionally, the water recycling system 10 can include a water delivery device 22 to deliver water received in the storage tank 14 to the soil and subsoil of the surrounding landscape to maintain the moisture content of the landscape. The water delivery device 22 also can be utilized to deliver water to the aquifer.

The storage tank 14 provides a source of storage for water recycled by the residential water source 12. As illustrated in FIG. 2, water recycled by the residential water source 12 and received in the storage tank 14 can include recycled water from a shower, bathroom tub, bathroom sink and washing machine. Practically any residential source 12 of water can be adapted to the water recycling system 10 without difficulty. The residential water source 12 can be recycled directly into the storage tank 14. Other sources of water can be utilized to supply water into the storage tank 14. The water recycling system 10 can be adapted to permit water to be supplied from a lake or canal. The basic operation of the system 10 uses a storage tank 14 that allows water to be dispersed at a rate which prevents the water in the storage tank from becoming stagnant. Thus, by dispersing water from the tank 14 to the soil, subsoil, and aquifer the water table is replenished. Alternatively, in one embodiment of the invention, the water recycling system 10 can include a plurality of storage tanks 14. The water recycled from the residential water source 12 can be received by any of the storage tanks 14 adapted to the system 10. The water recycled to the plurality of storage tanks 14 can be routed to a storage tank 14 dependent on the particular usage. The storage tanks 14 can be accessed individually or simultaneously. The storage tanks 14 can include an opening 16 providing access to the storage tank 14 for maintaining and cleaning of the storage tank 14. Water can be filtered as the water enters and exits the storage tanks 14 utilizing the filter 40. Recycling water into a plurality of storage tanks 14 allows the separate storage tanks 14 to be designated for separate and specific purposes. For instance, one storage tank 14 can be designated for use related only to lawn care, while an additional storage tank 14 can be designated for cleaning purposes, such as washing a car or driveway. A plurality of storage tanks 14 can further provide the ability to use the storage tanks 14 for a variety of uses and provide specialized treatment of the water supply in the corresponding storage tank 14. Although a plurality of storage tanks 14 can be utilized, only one storage tank 14 is necessary for the system to remain functional.

Water received in the storage tank 14 can be filtered. Filtering water received in the storage tank 14 allows contaminants, such as lint and hair to be removed from the supply of recycled water. Additionally, recycled water received in the storage tank 14 can be sanitized utilizing chemical treatment. Chemically treating the supply of recycled water destroys bacteria that can be deleterious to the water and one's health. The level of chemical treatment can vary depending on the particular use of the recycled water. For instance, when utilizing water originally recycled from a washing machine and subsequently is used for lawn care may require the water to be chemically treated, so as to prevent washing byproducts from having a deleterious effect on the lawn. Dependant on the intended use of the water, minimal chemical treatment may be necessary. In the present invention, the system 10 also can be sanitized by periodically treating the system 10 with vinegar. The water recycling system 10 can be treated with vinegar by pouring vinegar into the drain at the recycling source. For example, vinegar can be poured into the drain of the bathroom sink or bathtub. Pouring vinegar into the drain allows vinegar to penetrate the drain and the attached pipes 18. Once vinegar enters the drains and attached pipes 18 it operates to destroy any bacteria that may exist. Additionally, vinegar can be added directly into the storage tank 14 to provide further sanitation benefits.

The storage tank 14 can be located underground as depicted in FIG. 1. Placement of the storage tank 14 underground assists in facilitating the flow of recycled water from the residential water source 12 and the attached pipes 18 to the storage tank 14. In one embodiment of the present invention, the storage tank 14 can be placed above ground. The size of the storage tank 14 can vary according to the expected water usage. The size of the storage tank 14 used should be constructed based on considerations of residence size, number of occupants of the residence and utility of the recycled water from the residence. For instance, a residence that intends to use the recycled water for watering a large lawn may consider installing a large storage tank 14 suited for the size of the particular lawn. However, a residence of few occupants combined with having a small lawn may consider installing a smaller storage tank 14 with the water recycling system 10.

A float switch device 28 can be included in the water recycling system 10. The float switch device 28 can be located inside of the storage tank 14. The float switch device 28 operates to deactivate and activate the pump 24 and the corresponding flow of water from the storage tank 14 at a predetermined water level within the storage tank 14. For instance, if the water level is at a predetermined level which indicates that the storage tank 14 is at a low capacity, then the float switch device 28 can operate to prevent the attached pump 24 from pumping water from the storage tank 14. In addition, the float switch device 28 can allow the storage tank 14 to fill before the pump removes any further water from the storage tank 14, instead of pumping extremely small increments from the storage 14. The float switch device 28 can provide the system 10 with the ability to discontinue the discharging of recycled water out of the storage tank 14 and disengage the pump 24 at varying water levels and conditions. For example, the float switch device 28 can be activated upon the condition indicating that water is no longer being received by the storage tank 14 from the residential water source 12 or alternatively the float switch device 28 can be set deactivate in response to a predetermined water level. The float switch device 28 can provide consistent performance of the water recycling system 10 by maintaining quality control and ensuring that the pump 24 is properly activated.

A fail safe device can be included in the water recycling system 10 to further protect against the overflow of water in the system 10. The fail safe device can be attached to the piping connected to the storage tank 14. The fail safe device can operate when the storage tank 14 is full to divert water that normally would enter the storage tank 14 into alternative locations. For example, additional piping can be integrated into the water recycling system 10 that diverts water from a residential water source 12 into a sewer system 38. Diverting water into the sewer system 38 instead of the storage tank 14 prevents overflow in cases where the storage tank 14 is at capacity. The fail safe device protects from overflow by channeling water into the sewer system 38, thereby preventing the system 10 from receiving recycled water when the system 10 is at capacity. For instance, if the water from the washing machine or bathtub is being recycled by the system 10, the water can be diverted into an alternative location, such as the sewer system 38 or other suitable alternate location. In a water recycling system 10 that has multiple storage tanks 14, the recycled water can be diverted to an attached storage tank 14 designated for such purposes.

The pump 24 can be adapted to the pipes 18 included in the water recycling system 10. The pump 24 can be connected to the storage tank 14 via pipes 18 exiting the storage tank 14. In one embodiment of the present invention the pipes 18 connecting the pump 24 to the storage tank 14 can be located on the opposite end of the storage tank 14 in relation to the pipes 18 attached to the storage tank 14 for the purpose of delivering residential water to the storage tank 14. The pipes 18 connecting the pump 24 to the storage tank 14 primarily serve as an outlet for water exiting the storage tank 14. Pipes 18 also can be connected directly from the residential water source 12 to the storage tank 14. In the present invention, pipes 18 can connect the bathroom sink, bathtub, washing machine and other sources 12 to the storage tank 14. There is no limit to the number or type of residential water sources 12 that can be connected to the storage tank 14. The water recycling system 10 can utilize gravity to fill the storage tank 14 and control water overflow without any additional pumps and valves. Water that flows through the pipes 18 to be recycled can be gravity driven. The pipes 18 are assembled to allow gravity to propel water from the connecting pipes 18 into the storage tank 14. Positioning the pipes 18 at a higher level than the attached storage tank 14 further facilitates the flow of recycled water to the storage tank 14 by enhancing the effect of gravity on the water. A back flow structure 20 can be incorporated into the pipes 18 which serve as an outlet for exiting water. The back flow structure 20 maintains the priming of the pump and assists in preventing water from recirculating through the attached pipes 18 toward the storage tank 14 after the water has exited the storage tank 14.

The pump 24 connected to the storage tank 14 can comprise a motor 32 equipped to handle the capacity of the attached storage tank 14. The motor size of the pump 24 can be determined by sprinkler size (number of heads, size of pipes, total capacity) and the type of system, such as well, canal, lake or city water. A motor 32 with increased horsepower may be needed to handle the capacity of a storage tank 14 of larger dimensions. Adequate motor size in relation to the size of the storage tank 14 used in the water recycling system 10 can be important in regards to maintaining a constant flow of water as the residential water exits the storage tank 14. A contactor 36 also can be coupled to the motor 32.

The pump 24 can be mounted on a cement pad 34. Mounting the pump 24 on the cement pad 34 keeps the pump stable and prevents damage resulting from vibration. A protective covering also can be included to provide increased protection to the pump 24. Recycled water that exits the system 10 via the pump 24 can be delivered to the attached sprinkler device. A shut off valve 42 can be included in the system to allow water to run into the sewer system 38 when the system is non operational due to repairs or other similarly related occurrences.

A water delivery device 22, such as a sprinkler, can be adapted to the water recycling system 10 to dispense water received in the storage tank 14. The water delivery device 22 can be utilized to deliver water to the soil and subsoil of the landscape to maintain the moisture content of the landscape. The water delivery device 22 can also be adapted to a time clock 26. The time clock 26 can operate to deactivate the water delivery device 22 under specified conditions. For example, the time clock can be utilized to allow water to be dispersed from a storage tank only during night hours or morning hours. Dispersing water at the most effective time further promotes the delivery and benefits of the water to the landscape and aquifer. The time clock 26 provides a control mechanism that can prevent the excessive watering of lawns which can cause valuable nutrients to be depleted from the lawn, in addition to the needless consumption of water. The time clock 26 also can be used to regulate the times the lawn is watered. Regulating the delivery of water to the lawn can result in water being more effectively delivering nutrients to the lawn and promoting lawn growth.

It will of course be understood that the invention is not limited to the specific details described herein, which are given by way of example only, and that various modifications ans alterations are possible within the scope of the invention as defined herein. Those skilled in the art may make modifications that include variations in size, materials, shape, form, function and manner of operation, without departing from the principles and concepts set forth herein.

What is claimed is:

1. A method of water recycling, said method comprising the steps of:
    collecting water from at least one residential water source;
    channeling water from the at least one residential water source through pipes via gravity to a storage tank;
    filtering water received in said storage tank to remove contaminants;
    treating water received in said storage tank with a sanitizing agent; and
    delivering water from said storage tank to soil and subsoil of surrounding landscape to maintain moisture content.

2. The method according to claim 1, wherein collecting water from at least one residential water source comprises collecting water from a shower, bathroom tub, bathroom sink and washing machine.

3. The method according to claim 1, wherein collecting water from at least one residential water source comprises collecting water from a body of water.

4. The method according to claim 3, wherein collecting water from at least one residential water source comprises collecting water from one selected from the group consisting of a lake, a canal, and a river.

5. The method according to claim 1, wherein channeling water from at least one residential water source comprises channeling water from a plurality of storage tanks.

6. The method according to claim 5, wherein channeling water from a plurality of storage tanks comprises channeling water from storage tanks that are individually accessible to provide specialized use.

7. The method according to claim 1, wherein filtering water comprises filtering said water as said water enters said storage tank and as said water exits said storage tank.

8. The method according to claim 1, further comprising the step of providing said storage tank positioned at a lower height relative to said pipes extending toward said storage tank.

9. The method according to claim 1, further comprising positioning said storage tank underground.

10. The method according to claim 1, further comprising providing said storage tank having an opening providing accessibility to said storage tank for cleaning and maintaining said storage tank.

11. The method according to claim 1, further comprising a back flow structure adapted to maintain prime of a pump in communication with the pipes and the storage tank.

12. The method according to claim 1, further comprising the step of providing said sanitizing agent including a chemically active substance to displace any accumulated bacteria.

13. The method according to claim 1, wherein delivering water from said storage tank to soil and subsoil of surrounding landscape comprises passing water through a water delivery device that dispenses water from said storage tank to surrounding soil, subsoil of landscape and aquifer.

14. The method according to claim 13 wherein delivering water from said storage tank to soil and subsoil of surrounding landscape comprises passing water through a pump to regulate delivery of water from said storage tank to said water delivery device.

15. The method according to claim 13, wherein delivering water from said storage tank to soil and subsoil of surrounding landscape comprises utilizing a time clock to regulate the operation of said water deliver device and delivery of said water.

16. The method according to claim 14, wherein delivering water from said storage tank to soil and subsoil of surrounding landscape comprises utilizing a float switch device to disengage said pump at predetermined water levels to regulate water flow.

17. A water recycling system for recycling residential water comprising;
    at least one residential water source;
    a storage tank to collect recycled water from at least one residential water source;
    a plurality of pipes, said pipes adapted to channel water from at least one residential water source via gravity;
    a filter affixed to said storage tank to remove impurities and provide a sanitizing agent to said water received in said storage tank; and
    a water delivery device to deliver water received in said storage tank to soil and subsoil of surrounding landscape to maintain moisture content of landscape.

18. The system according to claim 17, wherein said residential water source is selected from the group consisting of a shower, a bathroom tub, a bathroom sink, and a washing machine.

19. The system according to claim 17, wherein said residential water source includes a body of water.

20. The system according to claim 19, wherein said body of water is selected from the group consisting of a lake, a well, a canals and a river.

21. The system according to claim 17, wherein said water recycling system includes a plurality of storage tanks.

22. The system according to claim 17, wherein the storage tank comprises a plurality of storage tanks that are individually accessible to provide specialized use.

23. The system according to claim 17, wherein said filter is engaged as water enters said storage tank and as said water exits said storage tank to further remove any contaminants.

24. The system according to claim 17, wherein said storage tank is located underground to facilitate the gravitational flux of recycled water from said pipes into said storage tank.

25. The system according to claim 17, wherein said storage tank includes an opening to provide access to said storage tank for cleaning and maintaining of said storage tank.

26. The system according to claim 17, wherein said storage tank includes a back flow structure adapted to said pipes exiting said storage tank maintaining prime of a pump.

27. The system according to claim 17, wherein said water delivery device includes a sprinkler.

28. The system according to claim 27, where in said sprinkler is integrated with said storage tank, said sprinkler dispensing recycled water from said storage tank to surrounding soil, subsoil of landscape and aquifer.

29. The system according to claim 28, wherein said storage tank includes a pump integrated with said storage tank and said sprinkler.

30. The system according to claim 17, wherein said water delivery device comprises a time clock integrated with a sprinkler.

31. The system according to claim 30, wherein said time clock is adapted to regulate operation of said sprinkler and delivery of water.

32. The system according to claim 17, wherein said storage tank comprises a float switch device for controlling water movement through said storage tank and said plurality of pipes.

* * * * *